(12) United States Patent
Htoon

(10) Patent No.: US 7,767,096 B2
(45) Date of Patent: Aug. 3, 2010

(54) SYSTEM TO METER CHEMICALS INTO WATER IN A SWIMMING POOL

(76) Inventor: Philip M Htoon, 8010 E. Wingspan Way, Scottsdale, AZ (US) 85255

( * ) Notice: Subject to any disclaimer, the term of this patent is extended or adjusted under 35 U.S.C. 154(b) by 92 days.

(21) Appl. No.: 12/229,040

(22) Filed: Aug. 18, 2008

(65) Prior Publication Data

US 2009/0050577 A1 Feb. 26, 2009

Related U.S. Application Data

(60) Provisional application No. 60/965,261, filed on Aug. 20, 2007.

(51) Int. Cl.
*C02F 1/76* (2006.01)
(52) U.S. Cl. ............... 210/754; 210/167.11; 210/198.1; 210/238; 210/241

(58) Field of Classification Search ............... 210/747, 210/749, 753, 754, 756, 764, 167.1, 167.11, 210/198.1, 205, 241, 238, 470, 471; 222/174, 222/189.03, 196.1; 4/490, 222, 222.1; 422/28, 422/32, 37
See application file for complete search history.

(56) References Cited

U.S. PATENT DOCUMENTS 6,033,560 A * 3/2000 Kisner ................... 210/198.1

* cited by examiner

*Primary Examiner*—Matthew O Savage
*Assistant Examiner*—Lucas Stelling
(74) *Attorney, Agent, or Firm*—Tod R. Nissle

(57) ABSTRACT

A method to meter a granular chemical into water in a swimming pool provides a dispensation unit constructed to dispense a granular chemical at a selected rate per unit of time. The dispensation unit includes a device to open a container of the granular chemical. The dispensation unit functions to separate granular material for dispensation through apertures in the unit. The dispensation unit is charged with a granular chemical while the unit is upright. The unit is inverted in order to evenly distribute granular chemical on the surface of water in a swimming pool.

1 Claim, 4 Drawing Sheets

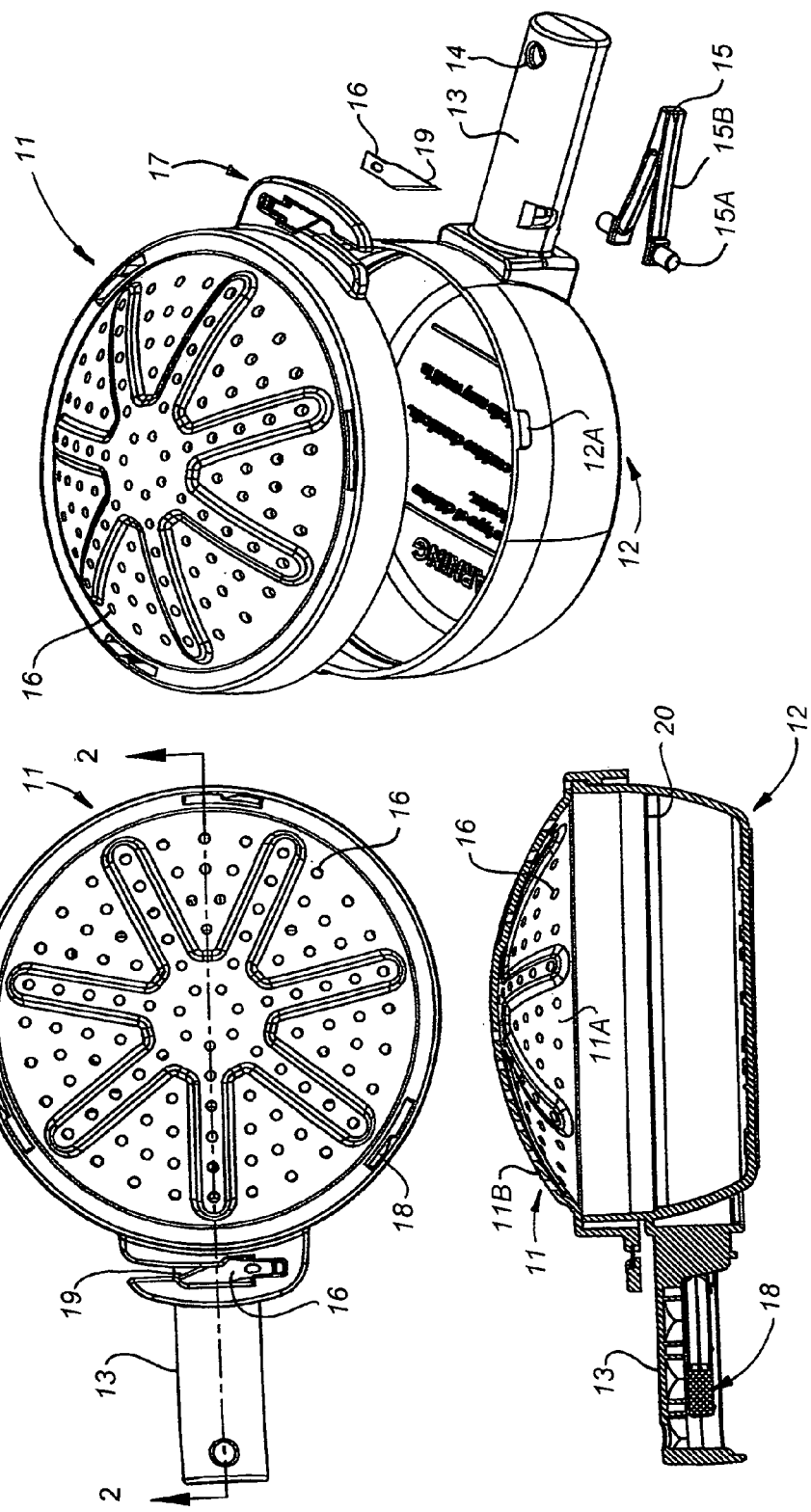

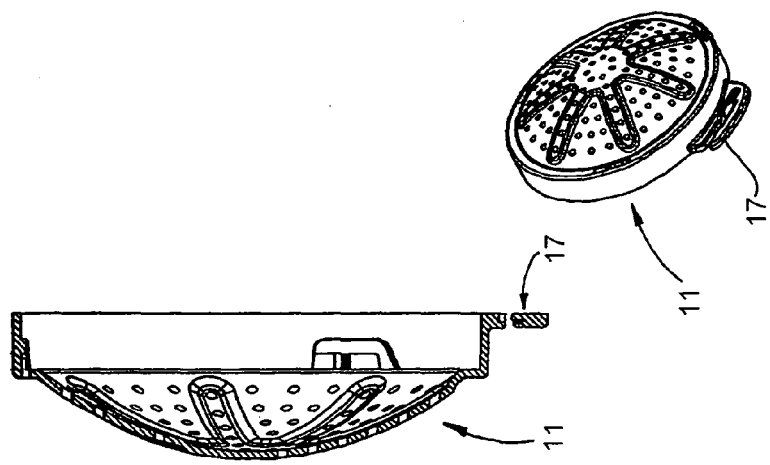
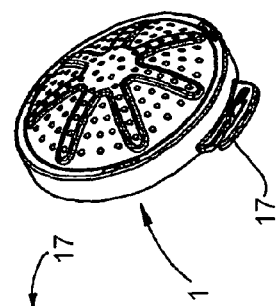
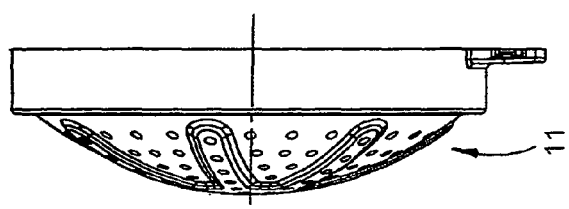
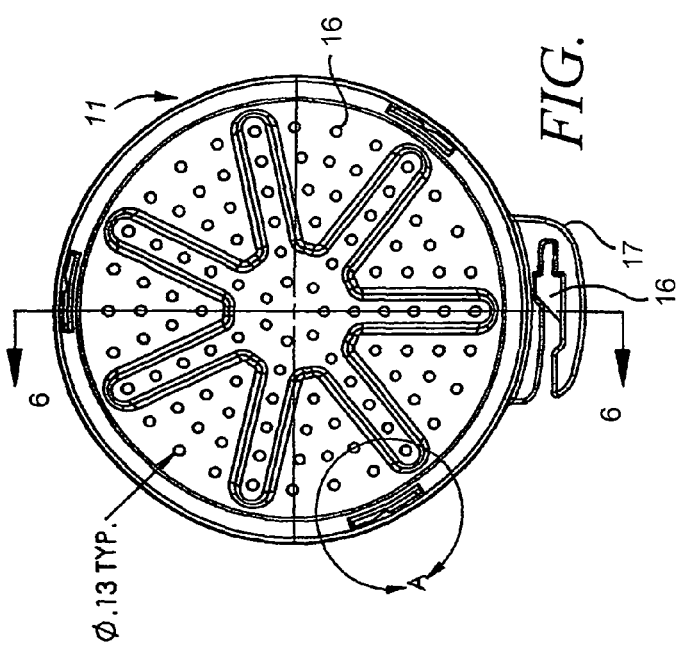
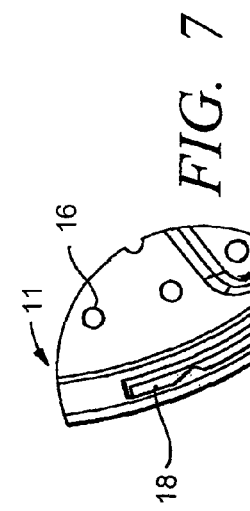

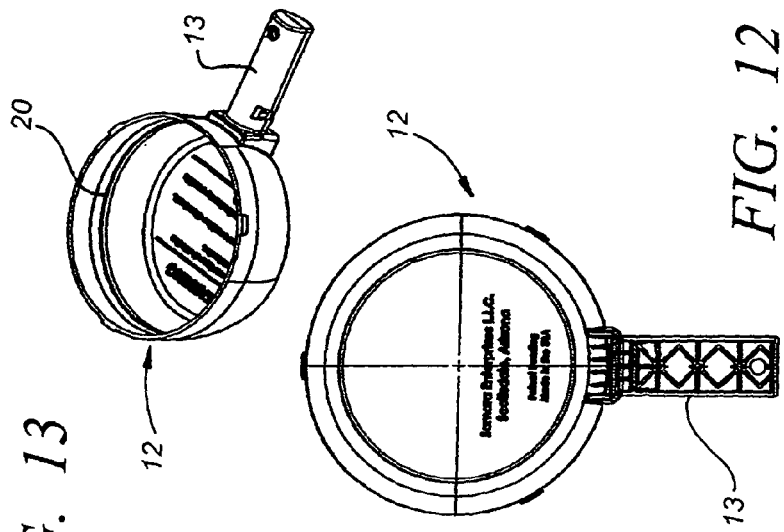
FIG. 13
FIG. 12
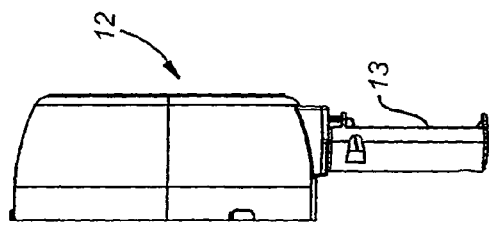
FIG. 11
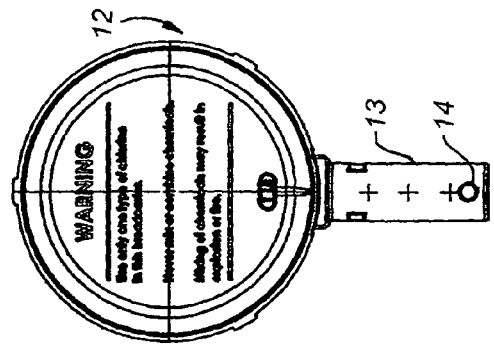
FIG. 9
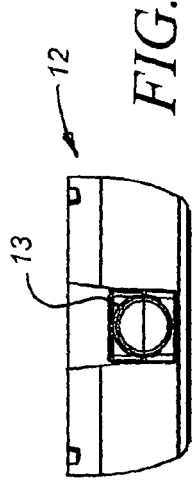
FIG. 10

SYSTEM TO METER CHEMICALS INTO WATER IN A SWIMMING POOL

This application claims priority based on provisional patent application Ser. No. 60/965,261 filed Aug. 20, 2007.

This invention pertains to the chemical treatment of water in a swimming pool.

More particularly, the invention pertains to a system to meter the distribution of granular chemicals over the surface of the water in a swimming pool.

Granular chemicals like soda ash, calcium hypochlorite, and sodium dichloro-s-triazinetrione dehydrate are commonly applied to the water in a swimming pool to control algae, adjust water pH, or for other reasons. Such granular chemicals are typically sold in a pouch. One corner of the pouch is cut off, and the user then walks around the perimeter of a swimming pool while pouring the contents of the pouch into water in the swimming pool. This procedure for administering granular chemicals has long existed and is believed to currently comprise a long felt dominant trend in the market place with respect to the administration of granular chemicals to a swimming pool. There may well be other systems to apply granular chemicals, but said procedure is by far the dominant trend in the market.

Likewise, the motivation to provide an improved methodology to administer granular chemical has long existed, but typically has not provided significant impetus to prompt the development of new inventions that are widely accepted and utilized in the marketplace with respect to the administration of granular chemicals into water in a swimming pool.

Further, any existing problems in the market typically have not provided significant impetus to prompt the development of new and improved procedures for administering granular chemicals in water in a swimming pools.

It would, however, be highly desirable to improve existing systems to administer granular chemicals to the water in a swimming pool.

Therefore, it is a principal object of the instant invention to provide a new method and apparatus to meter granular chemicals into the water in a swimming pool.

These and other, further and more specific objects and advantages of the invention will be apparent to those skilled in the art from the following detailed description thereof, taken in conjunction with the drawings, in which:

FIG. 1 is a top view illustrating a granule dispensing unit constructed in accordance with the invention;

FIG. 2 is a side section view of the granule dispensing unit of FIG. 1 taken along section line 2-2 and illustrating further construction details thereof;

FIG. 3 is an exploded perspective view illustrating the granule dispensing unit of FIG. 1;

FIG. 4 is a top view illustrating the lid of the granule dispensing unit of FIG. 1;

FIG. 5 is a side view illustrating the lid of FIG. 4;

FIG. 6 is a side section view of the lid of FIG. 4 taken along section line 6-6 and illustrating further construction details thereof;

FIG. 7 is a detail view of a portion of the lid of FIG. 4 taken from the area identified by circular line A in FIG. 4 and illustrating further construction details thereof;

FIG. 8 is a perspective view illustrating the lid of FIG. 4;

FIG. 9 is a top view illustrating the base of the granule dispensing unit of FIG. 1;

FIG. 10 is a front view illustrating the base of FIG. 9;

FIG. 11 is a side view illustrating the base of FIG. 9;

FIG. 12 is a bottom view illustrating the base of FIG. 9;

FIG. 13 is a perspective view illustrating the base of FIG. 9; and,

Figure 14:
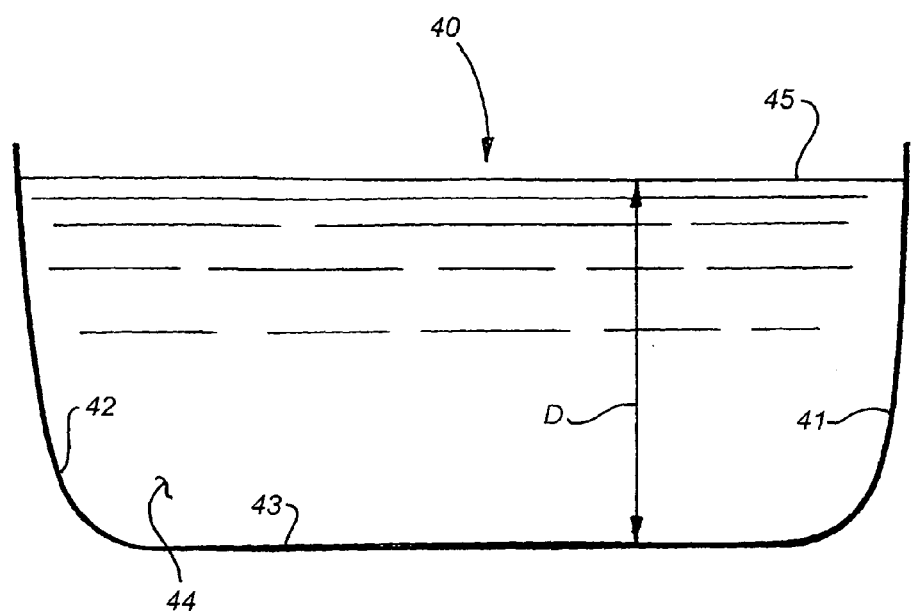
FIG. 14 is a side section view illustrating a swimming pool.

Briefly, in accordance with the invention, provided is an improved method to meter into the water in a swimming pool water soluble chlorine-containing granules of a granular water treatment chemical contained in a closed product container. The granules have a selected size and a specific gravity greater than that of water. The swimming pool includes vertically oriented sides and a horizontally oriented bottom, and has a maximum depth of at least four feet. The water in the swimming pool has an upper generally horizontally oriented surface area of at least one hundred and fifty square feet. The improved method of the invention minimizes chlorine damage to the sides and bottom of the pool, and facilitates the even distribution of granules over the upper surface of the water in the swimming pool. The method comprises the step of providing a granule dispensing unit. The unit comprises a base having a top and a bottom, a lid detachably mounted on the top of the base and including an inner surface, an outer surface, and a selected quantity of spaced apart, apertures formed through said lid and extending from the inner surface to the outer surface to form granule separating edges on the inner surface. The apertures each are sized to dispense granules at a selected rate. The unit also includes a handle. The improved method further comprises the steps of providing a pole removably attachable to the handle; removing the lid from the base; opening the product container; emptying a selected amount of the water soluble chlorine-containing granular chemical from the product container into the base; attaching the lid to the top of the base; attaching the handle to the pole; inverting the dispensing unit above the water in the swimming pool; and manipulating the pole to (1) simultaneously move the pole and the dispensing unit laterally over and a selected distance above the water in the swimming pool, and oscillate the pole and dispensing unit to move the granular chemical over the inner surface to contact granular chemical with the edges to separate granules and meter granules at the selected rate downwardly through the apertures onto water in the swimming pool, and (2) distribute substantially evenly over a water surface distribution area of at least 100 $ft^2$ of the upper surface area of the water the chlorine containing granules to achieve, when the temperature of the water is at least seventy-five degrees F., at least 50% dissolution of the granules prior to the granules settling on the bottom of the pool, and to achieve in any one foot square area of the water surface distribution area with respect to a different one foot square area of the water surface distribution area a ratio of volume (or weight) of granules distributed in the range of 0.5:1.0 to 2.0:1.0.

Turning now to the drawings, which depict the presently preferred embodiments of the invention for the purpose of illustrating the practice thereof and not by way of limitation of the scope of the invention and in which like reference characters refer to corresponding elements throughout the several views, FIGS. 1 to 3 illustrate a granule dispensing unit 10 constructed in accordance with the invention and generally indicated by reference character 10. Unit 10 includes lid 11 and base 12. Spaced apart apertures 16 are formed through lid 11 and extend from inner surface 11A to outer surface 11B. Apertures 16 are preferably, but not necessarily, tapered, and, taper from inner surface 11A to outer surface 11B. In other words, the width of an aperture is greater at surface 11A than at surface 11B. Apertures 16 form circular inner edges at surface 11A. The shape and dimension of apertures 16 and the inner edges thereof can vary as desired. The inner edges function to engage and separate granules and direct granules through apertures 16 when unit 10 is inverted from the orientation of FIG. 2 and is oscillated back and forth. Each aperture 16 is shaped and dimensioned as desired to permit a selected quantity of a particular sized granule to pass through aperture 16 during a selected period of time when unit 10 is (when lid 11 is secured on base 12) inverted and oscillated with granules inside unit 10. This metering by apertures 16 enable to user to better control the rate at which a granular chemical is dispensed on the surface of water in a swimming pool. The granule size (and consequently the aperture size) can vary as desired. However, many granular water treatment chemicals for swimming pools presently have relatively small granules, and often are in the form of a powder. Consequently, apertures 16 need not be particularly large and presently typically have a width (at the smallest cross sectional area of the aperture— which presently occurs at the outer surface 11B of lid 11) in the range of about one-sixteenth to one-quarter of an inch.

Cutter assembly 17 is, if desired, mounted on lid 11 (or base 12) and includes knife or blade 16 mounted therein. Blade 16 includes cutting edge 19.

Handle 13 is attached to base 12. Resilient polymer spring clip 15 is mounted in handle 13 in conventional fashion such that nub 15A will extend outwardly through aperture 14 and through an aperture in the end of a hollow conventional swimming pool pole (not shown) such that handle 13 can be removably attached to the swimming pool pole. Handle 13 slides inside the end of the swimming pool pole. Nub 15A is depressed inwardly into aperture 14 and its associated arm 15B are depressed inwardly when handle 13 is slid into the swimming pool pole. When aperture 14 is in registration with an aperture on the end of the swimming pool pole, arm 15B resiliently rebounds outwardly and nub 15A moves outwardly to extend through both the aperture 14 and the aperture in the end of the swimming pool pole.

If desired, a hollow storage container or member 18 can be formed on or attached to handle 13 (or elsewhere on unit 10) to receive and store pH strips (not shown) or other strips utilized to test the water in a swimming pool.

Slots 18 formed in lid 11 are shaped and dimensioned to removably engage slots 12A or other portions of base 12 to secure lid 11 on base 12. Any desired means can be provided to secure removably lid 11 on base 12.

Gradient(s) or measurement line(s) 20 formed on the interior of base 12 indicate a particular volume or weight, for example one cup, that is achieved when base 12 is filled to that measurement line 20 with shock or another granular chemical.

As used herein, the size of granules can indicate that the granules are generally each of an equivalent size, can indicate that the granules generally are each less than or equal to a particular size, or, that the granules each fall into a certain range of sizes. The size of a granule is typically, but not necessarily, indicated by the maximum width of the granule.

As used herein, oscillation of unit 10 indicates that unit 10 is being moved laterally back-and-forth by moving unit 10 from side-to-side, is being moved back-and-forth by moving unit 10 up and down, and/or is being moved both side-to-side and up-and-down.

FIG. 14 illustrates a swimming pool 40 including sides 41 and 42, bottom 43, and a volume of water 44. Water 44 has a generally horizontally oriented upper surface area 45. While the dispensing apparatus of the invention can be utilized in connection with a swimming pool or other pool of any desired size, one principal embodiment of the invention presently concerns swimming pools having a maximum depth, indicated by arrows D in FIG. 14, of at least four feet and, having an upper water surface area of at least 150 square feet. In the event the size of such a swimming pool exceeds 150 square feet, such size can vary as desired, but typically the maximum size of a swimming pool utilized in conjunction with the invention would be equivalent to a fifty meter Olympic sized pool with at least eight swimming lanes. The large majority of pools that are used for swimming have a maximum depth of at least four feet and an average depth of over three feet- except for areas of the pool which may include steps or underwater seats. If the average depth of the pool is not at least three feet, more typically at least four feet, it becomes impractical for an adult to utilize the pool to swim laps.

The initial object of the invention was to provide an improved method and apparatus for applying shock and other chlorine containing granules to a swimming pool so that the likelihood of getting granules on clothing and of inhaling chlorine could be minimized. After the invention was developed, however, other benefits were discovered.

First, the dispensing unit 10 of the invention facilitates the gradual distribution of granules into a swimming pool. When granules are poured into a pool from the pouch in which the granules are packaged, it is difficult to gradually dispense granules into the water. More likely, when granules are dispensed from a pouch or other container directly into a pool, a large quantity of particles are poured or broadcast into a limited area of the water and sink to the bottom of the pool. The chlorine in the particles then degrades the plaster or vinyl that comprises the bottom and sides of the pool.

Second, the dispensing unit of the invention facilitates the even distribution of granules over a large surface area of water in a pool. By way of example, and not limitation, a one pound bag of shock is typically distributed over at least a one hundred square foot area of the surface of water in a swimming pool. Such a wide distribution of granules also facilitates the dissolution of a substantial portion of the granules before the granules have the opportunity to settle on the bottom 43 of a swimming pool 40 and act to degrade and damage the bottom of the pool. When the water temperature is 75 degrees F., generally 50% of the total volume of shock granules dispensed on the pool water dissolves prior to the granules settling to the bottom of a swimming pool with a depth of at least three feet. This is the case with various granular shock products currently offered in the market. Some granules dissolve completely. A substantial portion of other granules dissolves such that the portion of the granules remaining when the granules finally settle on and contact the bottom 43 of pool 40 is minimized. Dispensing unit 10 can, when attached to one end of a conventional swimming pool hollow aluminum pole, be readily manipulated over the surface of a pool and, along with visual monitoring by a user to monitor the distribution of granules, greatly facilitates the generally even distribution of chlorine containing granules such that the ratio of the volume (or weight) of granules distributed in any first square foot water surface area with respect to the volume of granules distributed in any second square foot water surface area different from said first square foot area is in the range of 0.5:1.0 to 2.0:1.0, preferably 0.75 to 1.0 to 1.75:1.0, and most preferably 0.75:1.0 to 1.25:1.0. Both the first and second square foot areas lie within the portion of the water surface area 45 of the pool in which granules are distributed, i.e., granules are not necessarily distributed over the entire water surface area 45 of the pool and the granule distribution area often will be less than the total surface area 45 of the pool. For example, if 0.006 pound of granules is distributed in a first square foot water surface area, and 0.01 pound of granules is distributed in a second square foot water surface area different from said first square foot water surface area, the ratio of the weight of granules distributed in the first and second areas is 0.6:1.0, which falls within the range of 0.5:1.0 to 2.0:1.0. Similarly, if 0.018 pound of granules is distributed in a first square foot water surface area, and 0.01 pound of granules is distributed in a second square foot water surface area different from said first square foot water surface area, the ratio of the weight of granules distributed in the first and second areas is 1.8:1.0, which falls within the range of 0.5:1.0 to 2.0 To 1.0.

Third, the dispensing unit 10 facilitates the breakup of clumps of granules in at least two ways. One way such breakup occurs is when unit 10 is oscillated to cause granules in unit 10 to move about in unit 10, the granules contact the edges of apertures 16 formed in lid 11. The edges function to cause attached granules to break apart. A second way such breakup occurs is by removing lid 11 and mechanically, with a spoon or other instrument, breaking apart clumps of granules, after which the lid 11 is replaced and unit 10 is utilized to dispense the remaining granules onto at least a portion of the surface area 45 of water in the swimming pool 40. Granules sometimes form such clumps in the pouches in which the granules are packaged.

In use, a granule dispensing unit 10 is provided, along with a swimming pool pole. The pole has an end which can be removably attached to handle 13. Lid 11 is removed from base 12. A pouch or other container of shock or another chlorine containing granular product (or non-chlorine containing product) for treating the water in a swimming pool is acquired. The weight of the pouch can vary but is typically one pound. The top of the pouch is inserted in cutter assembly 17 such that edge 19 of blade 16 cuts open the pouch (or another tool is used to open the pouch). A quantity of the granular product sufficient to fill base 12 to a selected measurement line 20 is poured into base 12. For purposes of this example, it is assumed that the pouch is a one pound pouch and that the entire one pound of shock is poured into base 12. Lid 11 is secured to the top of base 12. One end of the swimming pool pole is attached to handle 13. The pole is manipulated to invert unit 10 over the water in a swimming pool at a selected height above the surface of the water. During windy days or other inclement weather, unit 10 may, desirably, be positioned by manipulating the swimming pool pole such that unit 10 is closer to the surface of the water. The swimming pool pole is then manipulated to simultaneously oscillate unit 10 (and the swimming pool pole) and to move unit 10 laterally over the surface of the water to dispense granules from inside unit 10 through apertures 16 and onto the surface of water in the swimming pool substantially evenly over a water surface area of at least fifty-square feet, preferably a water surface area of at least seventy-five square feet, and more preferably a water surface area of at least one hundred square feet.

As noted above, one particular unexpected benefit discovered after the invention was developed is that during the oscillation of unit 10 the aperture edges on inner surface 11A help to separate granules from one another and into apertures 16. This facilitates the dispensation at a continuous even rate or volume of granules from unit 10 and onto the surface of the water in a swimming pool.

Another unexpected benefit discovered after the invention was developed is that use of the cutting assembly 17 places a bag of shock or other granular product immediately adjacent base 12 and minimizes the likelihood that shock will be spilled from the bag after the product is open.

A further unexpected benefit discovered after the invention was developed is that the use of base 12 as a "measuring cup" facilitates the application of consistent quantities of a granular chemical to the water in a swimming pool, particularly when the pool is a non-standard size or is a large pool.

Having set forth my invention in terms to enable those skilled in the art to understand and practice the invention and having set forth the presently preferred embodiments and uses thereof, I claim:

1. A method to meter into the water in a swimming pool water soluble chlorine-containing granules of a granular water treatment chemical contained in a closed product container, the granules having a selected size and a specific gravity greater than that of water, the swimming pool
    including vertically oriented sides and a horizontally oriented bottom, and
    having a maximum depth of at least four feet, the water in the swimming pool having an upper generally horizontally oriented surface area of at least one hundred and fifty square feet, said method
minimizing chorine damage to the sides and bottom of the swimming pool, and
facilitating the even distribution of granules over the upper surface of the water in the swimming pool
said method comprising the steps of
    (a) providing a granule dispensing unit comprising
        (i) a base having a top and a bottom,
        (ii) a lid detachably mounted on said top of said base and including an inner surface, an outer surface, and a selected quantity of spaced apart, apertures formed through said lid and extending from said inner surface to said outer surface to form granule separating edges on said inner surface, said apertures each sized to dispense the granules at a selected rate, and
        (iii) a handle,
    (b) providing a pole removably attachable to said handle;
    (c) removing said lid from said base;
    (d) opening the product container;
    (e) emptying a selected amount of the water soluble chlorine-containing granular chemical from the product container into said base;
    (f) attaching said lid to said top of said base;
    (g) attaching said handle to said pole;
    (h) inverting said dispensing unit above the water in the swimming pool;
    (i) manipulating said pole to
        (i) simultaneously
            move said pole and said dispensing unit laterally over and a selected distance above the water in the swimming pool,
            oscillate said pole and dispensing unit to move the granular chemical over said inner surface to contact granular chemical with said edges to separate granules and meter granules at said selected rate downwardly through said apertures onto water in the swimming pool, and
        (ii) distribute substantially evenly over a distribution area comprising a total of at least 100 ft$^2$ of the upper surface area of the water to achieve,
            when the temperature of the water is at least seventy-five degrees F., at least 50% dissolution of the granules prior to the granules settling on the bottom of the pool, and
            in any one foot square area of said distribution area with respect to a different one foot square area of said distribution area a ratio of volume of granules distributed in the range of 0.5:1.0 to 2.0:1.0.

* * * * *